United States Patent Office 2,857,431
Patented Oct. 21, 1958

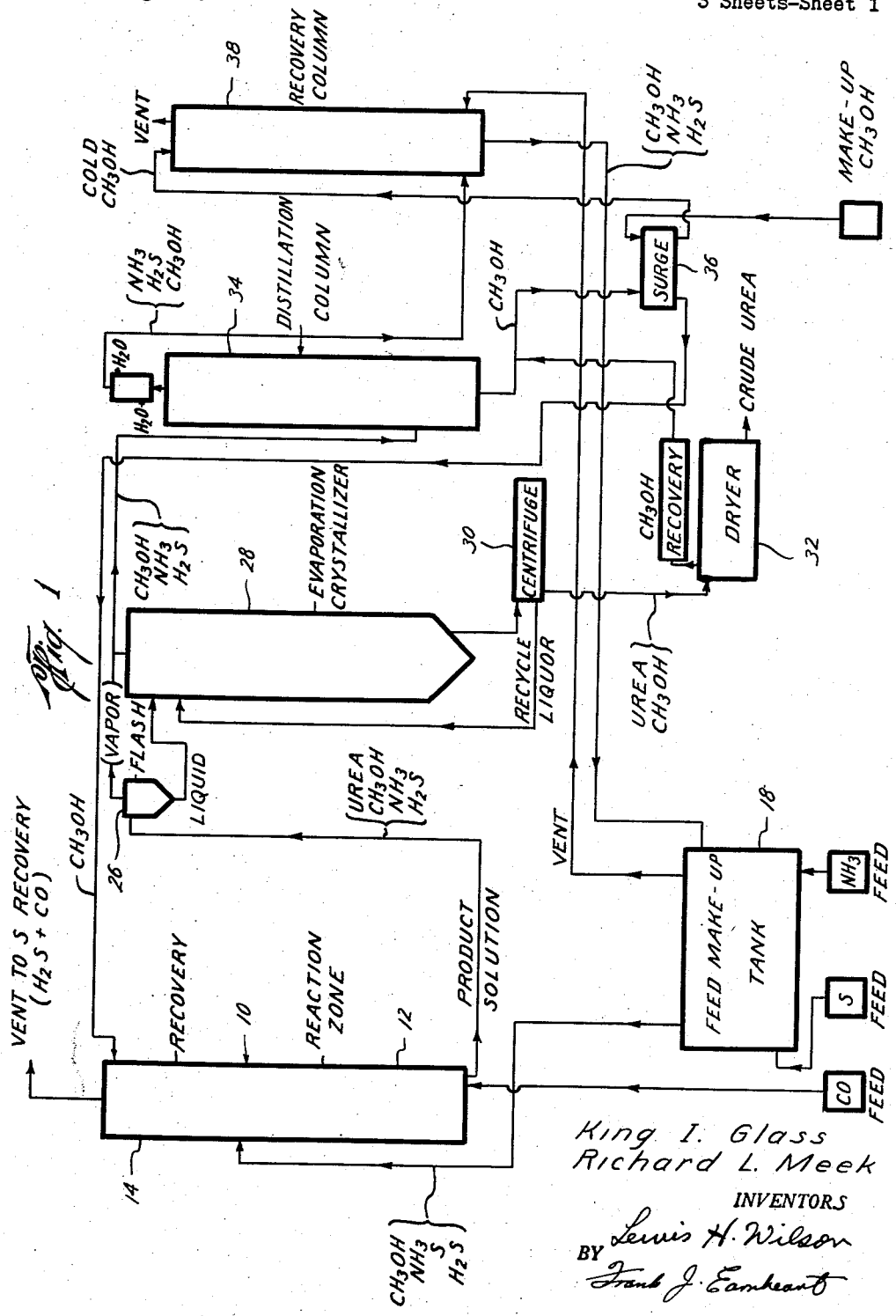

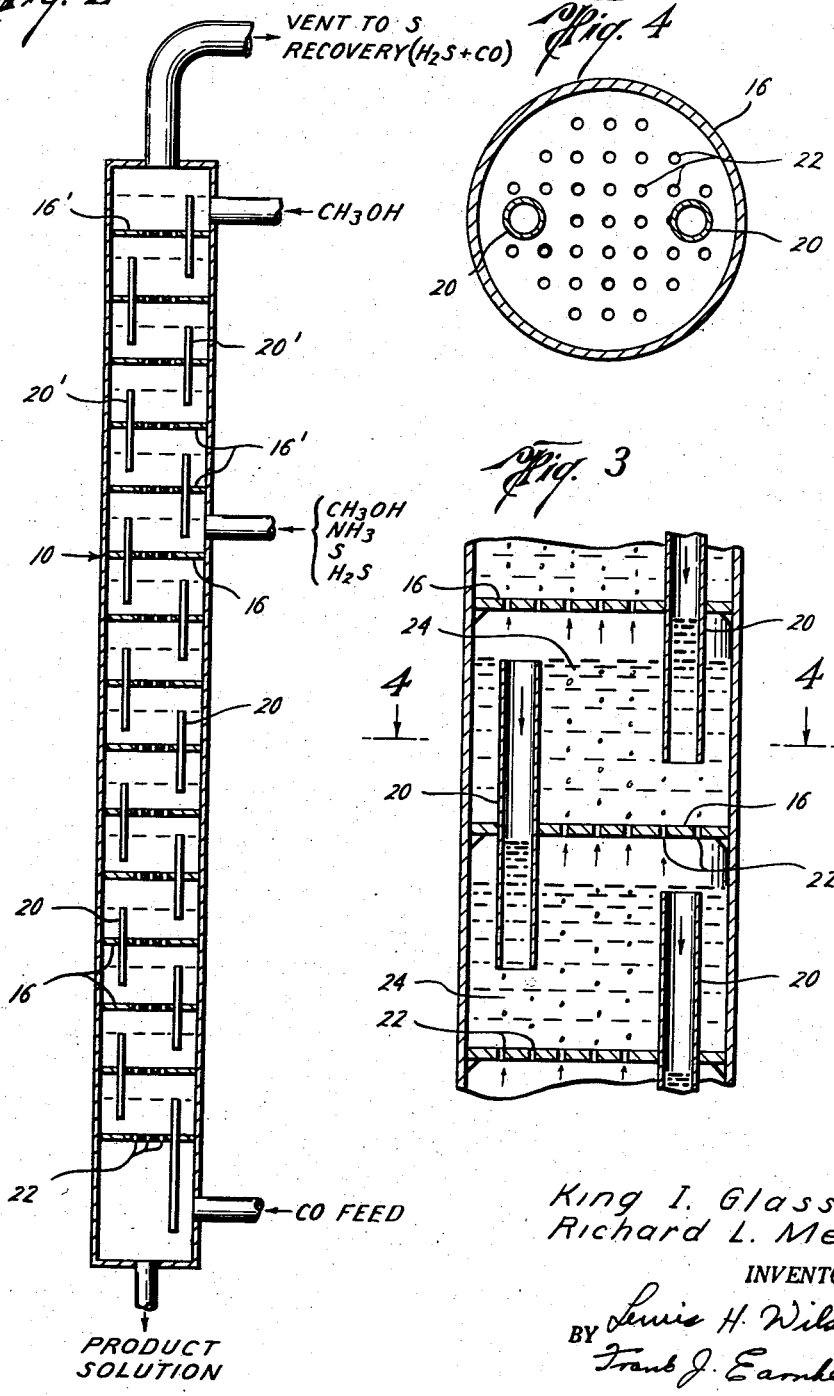

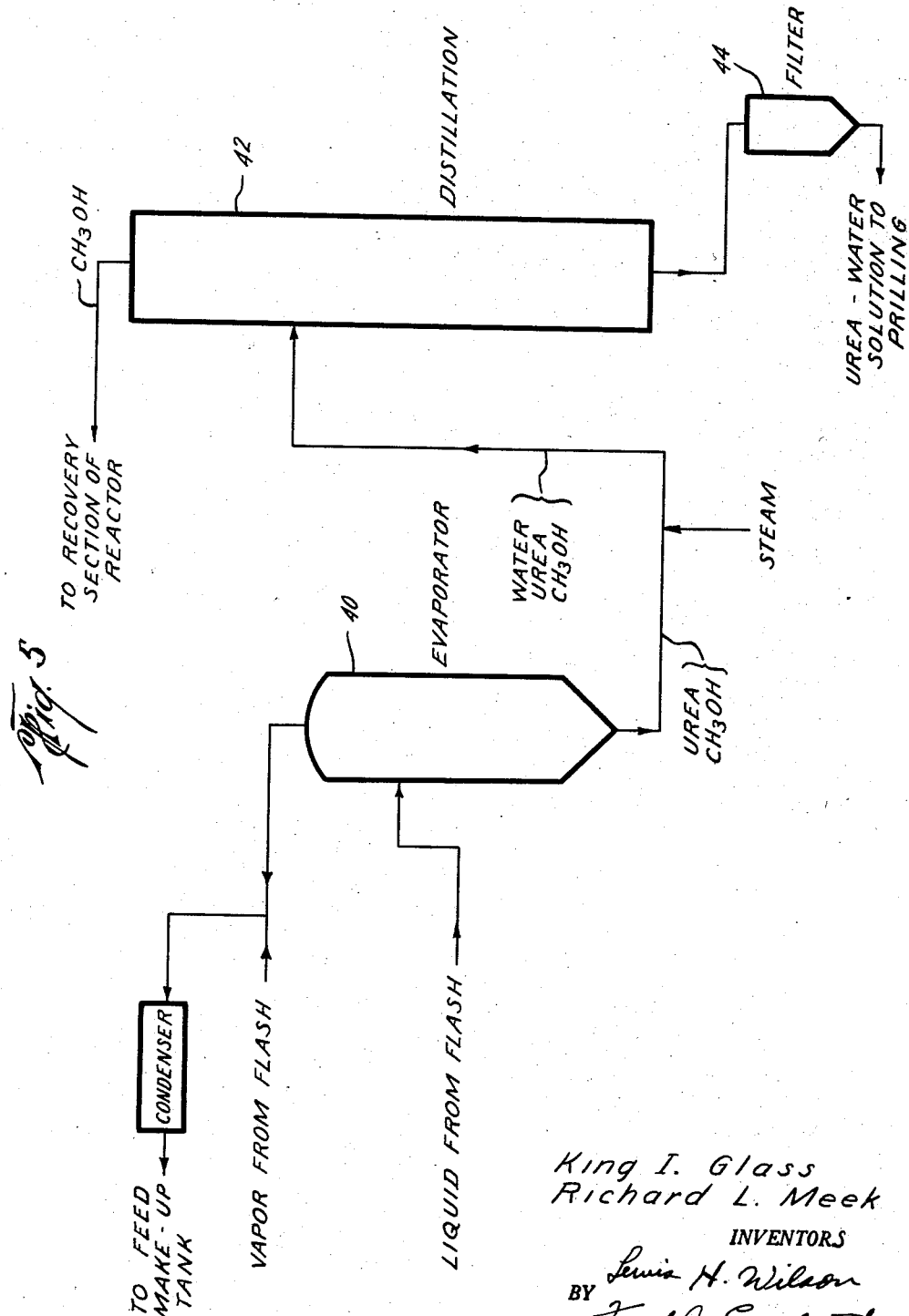

2,857,431
CONTINUOUS PROCESS FOR MAKING UREA

King I. Glass and Richard L. Meek, El Dorado, Ark., assignors, by mesne assignments, to Monsanto Chemical Company, St. Louis, Mo., a corporation of Delaware Application April 29, 1955, Serial No. 504,948

6 Claims. (Cl. 260—555)

The present invention is concerned with an improved continuous process for making urea by the reaction of ammonia, sulfur and carbon monoxide.

In the copending application of Applegath et al., Serial Number 437,882, now abandoned, assigned to the present assignee, there is disclosed an entirely new process for making ureas by reacting carbon monoxide, sulfur and ammonia or an amine, with the reaction being preferably carried out in the presence of a solvent such as methanol. As one means of carrying out the new process disclosed in the aforementioned application, it is indicated that the reactants may be fed into the base of a packed column together with carbon monoxide. Product urea in solution is removed from the top of the column and separated. The solvent is recovered for re-use, and the hydrogen sulfide and excess ammonia recovered in the form of ammonium sulfate and elemental sulfur. The present invention is concerned with improvements in the urea process disclosed in the aforementioned application.

While the cocurrent reaction of ammonia, sulfur and carbon monoxide in a packed column, as disclosed in the copending application, produces good product yields of urea economically as compared with the conventional prior art processes involving the reaction of ammonia and carbon dioxide under high pressure and temperature, we have found that this new urea process can be still further improved from the standpoint of operational steps to better adapt the process to continuous commercial operations.

It is accordingly a principal object of the present invention to provide an improved continuous process for making urea in high yields and degree of purity by the reaction of ammonia, sulfur and carbon monoxide.

A further object is to provide an improved continuous process wherein solvent, unreacted ammonia and by-product hydrogen sulfide carried in the product solution from the reaction zone are returned to the reaction system continuously, without resort to costly recovery steps.

A still further object is to provide an improved continuous process for making urea wherein the loss of reactant ammonia from the reaction zone is reduced to a minimum without the necessity of introducing undesirable contaminants to the reaction system.

A further object is to provide an improved continuous process for making urea wherein the product urea is produced in a high state of purity and in a form adaptable for making prilled urea for fertilizer applications.

Another important object is to provide a continuous process for making urea by the reaction of ammonia, carbon monoxide and sulfur wherein the loss of solvent from the reaction system is reduced to a minimum.

Other objects and advantages of the present invention will be apparent from the description which follows.

While it is known that urea can be prepared by reacting carbonyl sulfide with ammonia, commercialization of this process to the extent desired has been retarded. Possibly the main reason for this is that the cost of making the carbonyl sulfide is undesirably high.

Based on the discoveries of Applegath et al. as set forth in their copending application referred to, the use of carbonyl sulfide as a starting material is obviated, and ureas produced directly from carbon monoxide, sulfur and ammonia or an amine. Although the mechanism of this reaction is not understood, in accordance with the present improved process, yields of urea consistently better than 90%, based on ammonia fed, are possible, with yields resulting approaching 100% based on sulfur fed. Furthermore, with our improved process, we are able to produce nearly 100% pure urea at an improved rate.

In carrying out the process of the present invention, ammonia and sulfur in solution are introduced to the reaction zone of a perforated plate column which will be described in more detail subsequently. The ammonia-sulfur solution is heated to urea-forming temperature and introduced into the column at a point so as to flow countercurrent to a stream of carbon monoxide introduced at the lower end of the column. The reaction zone is maintained at a temperature of about 100° C., and the carbon monoxide is introduced under pressure which for best operating efficiency, is at least equal to the vapor pressure of the solvent mixture at urea-forming temperature. For maximum yields, however, the carbon monoxide is introduced at about 250 p. s. i. g. wherein methanol is employed as the solvent. Pressures substantially above this are not only uneconomical, but are unnecessary for maximum yields with this solvent. The carbon monoxide is preferably introduced in excess of the stoichiometric amounts needed for the reaction.

The plate column which we employ in our improved process is divided into two sections. The portion of the column from the point of entrance of the feed solution to the bottom thereof constitutes the reaction zone, with the upper portion constituting a recovery zone where the unreacted ammonia and solvent vapors tending to escape from the reaction zone are returned thereto in a manner more fully described in connection with the drawings. For each mol of urea produced by our process, one mol of hydrogen sulfide is produced. A substantial portion of this by-product hydrogen sulfide, together with excess carbon monoxide from the reaction zone, are also vented through the recovery zone.

Product urea, admixed with solvent and small amounts of unreacted ammonia and some by-product hydrogen sulfide, is removed from the bottom of the reaction zone. The urea is separated from the solvent mixture with the latter being returned to the reaction system.

Figure 1 of the drawings show diagrammatically the preferred manner of carrying out the improved process of the present invention.

Figure 2 is a vertical sectional view of the plate column shown diagrammatically in Figure 1, illustrating the inner arrangement of the reaction and recovery zones of the column.

Figure 3 is an enlarged detailed partial section of the reaction zone of Figure 2, showing the manner in which the solvent solution passes countercurrent to the movement of the carbon monoxide through the reaction zone.

Figure 4 is a top view taken along the line 4—4 of Figure 3, showing in detail the construction of the plates in the column.

Figure 5 shows diagrammatically a partially modified process for making urea in the form of a saturated solution for delivery to a prilling tower, with only that portion of the process representing a modification over Figure 1 being set forth.

Our improved process will now be described in more detail with reference first to Figures 1, 2, 3 and 4 of the drawings. A column 10, comprising a reaction zone 12 and a recovery zone 14, is provided with a series of perforated plates 16 spaced conveniently about a foot apart throughout the length of the column 10. For accurate control of the temperature in the column, electrical heating elements, or steam coils may be employed around the reaction zone 12 of the column. Other heating arrangements may be employed as desired. In view of the fact, however, that the ammonia-sulfur solution is introduced to the reaction zone at urea-forming temperature, the exothermic nature of the reaction is usually sufficient to maintain the proper temperature in this zone without resort to external heating means. The recovery zone 14 of the column 10 is water-jacketed for cooling purposes.

The ammonia-sulfur-solvent mixture is prepared in feed make-up tank 18. Ammonia is fed into the tank 18, which is initially charged with a suitable solvent, preferably methanol. Sulfur is also charged to the tank 18, either in a molten condition or in a finely dispersed form. A small amount of hydrogen sulfide is also preferably introduced to the tank 18 to increase the solubility of the sulfur in the solvent. The feed solution may contain from 1% to 30% sulfur, but preferably from 20% to 25%. The ammonia and sulfur may be charged in a ratio of 2 to 4 mols of ammonia to 1 mol of sulfur, but we prefer a ratio of 2.2 to 2.5 mols of ammonia for each mol of sulfur or maximum recovery economy. A mol ratio of ammonia to sulfur of at least 2 to 1 is required for the reaction.

The feed solution from the tank 18 is passed through a heat exchanger (not shown) and brought to urea-forming temperature which may be in the range of 60°–130° C. with about 75° C. being preferred as the maximum temperature for introducing the feed solution. A temperature in excess of 75° C. causes an excessive increase in the vapor pressure of the ammonia in the solution. Although not critical, the liquid reactants are introduced into the top of the reaction zone 12 of the column 10 approximately midway between the top plate 16 of this zone and the lower plate 16' of the recovery zone 14. As previously indicated the reaction zone is maintained at a temperature preferably between 90°–105° C., although slightly lower and higher temperatures are permissible.

While the above arrangement for introducing the feed solution is preferred from the standpoint of simplicity and compactness, there are certain advantages to introducing a portion of the required ammonia to the reaction zone 12 separately. We have found that if about 50% of the ammonia required is introduced to the reaction zone with the solvent-sulfur solution in the manner described, and the remaining ammonia introduced to the column at some point nearer the lower end of the reaction zone, the vapor pressure of the feed solution is substantially reduced, permitting the introduction of the feed solution at a temperature closer to the optimum urea-forming temperature maintained in the reaction zone 12. In addition, such an alternative arrangement reduces the amount of ammonia tending to escape into the recovery zone 14.

Carbon monoxide is fed to the bottom of the reaction zone 12 at a point below the last plate 16. The carbon monoxide is introduced at a pressure dependent to a degree upon the vapor pressure of the ammonia-sulfur solution. A number of solvents are set forth in the copending application referred to as suitable for carrying out the reaction. When methanol as solvent, pressures as low as 45 p. s. i. g. can be tolerated, however, a pressure of at least 175 p. s. i. g. representing the vapor pressure of the solvent mixture at urea-forming temperature is preferred. The carbon monoxide is preferably introduced to the column at 250 p. s. i. g.; the optimum pressure required for the reaction. The discharge of off gases through the column vent is regulated to maintain the required pressure in the reaction system. Referring to Figures 2, 3 and 4, each of the plates 16 and 16' are provided with open-ended weir pipes 20 and 20' respectively which extend through the plates 16 and 16'. It will be observed that the weir pipes 20 and 20' extend through plates 16 and 16' alternately on opposite sides thereof, each being provided with a series of perforations 22 through which the carbon monoxide and other gaseous constituents pass upwardly through the column.

The feed solution introduced at the top of the reaction zone 12 flows down through the reaction zone by gravity, in the form of a series of spaced liquid columns 24 through which the carbon monoxide passes in its upward path through the reaction zone. The velocity of the carbon monoxide flowing through perforations 22 prevents any flow of ammonia-sulfur solution therethrough, with the lower portions of the weir pipes 20 in turn each being immersed in the liquid column immediately below the plate 16 through which it extends forming a liquid seal, so as to prevent passage of carbon monoxide through these pipes. Each of the spaced liquid columns 24 becomes progressively richer in product urea and leaner in reactant sulfur from the point of entrance of the feed solution to the point of entrance of the carbon monoxide fed at the bottom of the reaction zone 12.

The ammonia and solvent vapors tending to escape from the reaction zone 12 pass upwardly through the recovery zone 14 which is similar in design to the reaction zone 12. A portion of the solvent together with a trace of ammonia recovered from the product solution is returned to the top of the recovery zone 14 to form a series of spaced liquid columns in the same manner as with the feed solution. The ammonia and solvent vapors which pass through perforations 22 in the recovery zone, are thereby absorbed by the solvent and returned to the reaction zone 12. Excess carbon monoxide and by-product hydrogen sulfide are vented from the top of the recovery column 14, with the sulfur value being recovered by a well-known means. Ordinarily, the excess carbon monoxide need not be recovered.

A product solution is removed from the bottom of reaction zone 12 comprising essentially urea, ammonia, solvent, and a small amount of by-product hydrogen sulfide. The product solution is carried through a heated line and flashed in the vessel 26 to separate the ammonia, hydrogen sulfide and a substantial portion of solvent from the product urea, enough solvent being left with the urea to maintain it in fluid condition for easy handling. The urea-solvent solution is carried to an evaporator-crystallizer column 28, where the urea is crystallized, and an additional portion of solvent is removed. The crude urea crystals are centrifuged at 30, and dried to remove the last traces of solvent in the dryer 32. The crude urea, which is about 99% pure, may be recrystallized or purified by treatment with ozone where a resin grade product is desired. The crude urea, or as purified, may also be employed in making a prilling solution where the urea is intended for fertilizer applications. Where the urea is to be prilled, however, the modified process of Figure 5 is preferred.

The solvent, ammonia, and hydrogen sulfide vapors from the flash vessel 26, and evaporator 28, are condensed and introduced to distillation column 34 where a substantial portion of the solvent, in the nature of 75%, is separated from the ammonia and hydrogen sulfide and delivered to surge tank 36. Solvent, together with a trace of absorbed ammonia, is removed from tank 36 for delivery to the recovery zone 14 of column 10 for the purpose previously described. The ammonia, hydrogen sulfide and the small remaining portion of the unseparated solvent are condensed and introduced to the column 38 where traces of carbon monoxide, carbon dioxide, nitrogen etc. accumulated in the solution system are vented to the atmosphere. Cold solvent from surge tank 36 is introduced into the top of column 38 to absorb any ammonia, hydrogen sulfide or solvent tending to escape from column 38. The vapors from feed make-up tank 18 are also recovered in column 38. The solvent requirements for the reaction system are provided from surge tank 36 by way of the recovery zone 14 and the column 38 which returns the recovered ammonia and by-product hydrogen sulfide collected by the solvent to feed make-up tank 18. Necessary make-up solvent is added to surge tank 36; however, very little solvent need be added as one of the important advantages of our improved process resides in the low loss of solvent from the system, which is less than one pound of solvent per 100 pounds of urea produced under normal operating conditions. The amount of by-product hydrogen sulfide carried over in the product solution is sufficient to solubilize the added sulfur in make-up tank 18, and it is therefore not necessary to remove this compound from the solution.

While methanol is the preferred solvent for carrying out our improved continuous process, as indicated in the copending application, Serial Number 437,882, now abandoned, other solvents such as amyl alcohol and benzene may also be used. While the reaction per se will proceed in the absence of a solvent, a solvent is required in the present improved continuous process.

In column A of Table I which follows, data from a typical run is presented to illustrate the advantages of our improved process. Column B of Table I contains data from a typical run involving the cocurrent reaction of ammonia, sulfur and carbon monoxide in a ring packed column in the manner taught in the copending application of Applegath et al., Serial Number 437,882, now abandoned. The improvement in purity, yield and reaction time together with over-all economies effected by our improved process is strikingly evident from a comparison of data from these two runs.

*Table I*

|  | A | B |
|---|---|---|
| Grams CO/min | 4.85 | 4.0 |
| Total Grams CO | 2,300 | 710 |
| Feed Solution Composition: |  |  |
| Percent NH₃ | 25.8 | 24.6 |
| Percent H₂S | 3.9 | 3.67 |
| Percent S | 19.2 | 19.37 |
| Percent CH₃OH | 51.1 | 52.3 |
| Grams Feed Sol'n./min | 18.5 | 19.25 |
| Total Grams Sol'n. (Feed) | 8,800 | 2,999 |
| Recovery Sol'n. Comp'n.: |  |  |
| Percent NH₃ | 1.2 | None |
| Percent CH₃OH | 98.8 | None |
| Gms. Recycle Sol'n./min | 10.5 | None |
| Total gms. recycle sol'n., grams | 5,040 | None |
| Product Sol'n. Comp'n: |  |  |
| Percent NH₃ | 3.24 | No Data |
| Percent H₂S | 1.42 | No Data |
| Percent S | 0.17 | 1.54 |
| Percent Urea | 31.46 | 36.2 |
| Percent CH₃OH | 63.7 | No Data |
| Total gms. product sol'n | 12,300 | 2,528 |
| Net urea production, grams | 3,870 | 915 |
| Rate of urea production, gms./min | 8.1 | 5.87 |
| Percent NH₃ converted to urea (based on feed) | 93.4 | 70.3 |
| Percent CO converted to urea (based on feed) | 78.5 | 68.2 |
| Percent S converted to urea (based on feed) | 99.1 | 84.1 |
| Percent S left in product (based on feed) | 1.0 | 6.7 |
| Percent S in product | 0.54 | 4.0 |
| Percent NH₃ lost in vent (based on feed) | .65 | No Data |
| Percent S utilized¹ | 99.0 | No Data |
| Percent NH₃ utilized¹ | 99.3 | No Data |
| Product purity | 99.5 | 96.0 |
| Reaction temp., °C | 100 | 99 |
| Reaction pressure, p. s. i. g | 250 | 250 |
| Duration of run, min | 480 | 156 |

¹ Utilized is actual percent which would be consumed on a recycle basis.

Figure 5 of the drawings represents a slight modification to our improved process as set forth in Figure 1. Urea has become increasingly utilized in recent years as a nitrogen fertilizer. For such application, urea is usually sold in the form of a pelleted or prilled product which may be easily applied to the soil uniformly by mechanical spreaders. The process as depicted in Figure 5 is adapted to produce urea directly in a form suitable for prilling from a spray tower. In accordance with this embodiment the solvent-ammonia-hydrogen sulfide vapor from the flash tank 26 of Figure 1 is condensed and returned directly to feed make-up. The urea-solvent solution from flash tank 26 is introduced to the evaporator 40, where additional solvent is removed from the urea leaving only a sufficient amount to permit its being pumped. Steam is introduced to the resulting solvent-urea mixture in the ratio of about one part by weight of steam to nineteen parts by weight of urea. After introducing the steam, the urea-water-solvent mixture is introduced to the distillation column 42. The heat introduced by the steam, plus additional heat supplied in the column 42 causes the remaining solvent to flash off as overhead to be condensed and returned to the recovery zone 14 of column 10.

The product urea is removed from the bottom of column 42 in the form of an aqueous slurry comprising about 95% urea and 5% water. This solution is passed through filter 44 while hot to remove water-insoluble impurities and delivered to a prilling tower for spraying wherein the product is designed for fertilizer applications. The urea-water solution must be kept heated to a temperature above the freezing point of the urea-water solution prior to spraying, which in the case of a prilling solution as above described would be about 121° C.

The modified process of Figure 5 is very important where urea fertilizer is the desired end product, as we have discovered that the introduction of steam to the urea-solvent mixture in this manner with subsequent distillation effects substantial purification of the urea to a degree satisfactory for most fertilizer applications. We are able to thereby obviate costly purification steps, where the urea is intended for this purpose.

The process of this invention presents numerous practical advantages over the methods heretofore employed in the production of urea. The cost for commercial production of urea by our process is substantially reduced, in that high temperatures and pressures are not employed, and the recovery and recycle system is simple and compact. Furthermore, under the conditions of our process, breakdown of urea is not a problem as with many of the prior art processes which handle the urea in a molten condition. The problem of corrosion, which may be material with prior art methods, is substantially eliminated in our process in that the urea is handled in the form of a solvent solution throughout most of our process, which in the case of methanol, obviates corrosion problems to a considerable extent.

In the specification and claims "urea" is intended to mean the compound $CO(NH_2)_2$.

While our process has been described in connection with specific embodiments, it is understood that the invention is not to be so limited. Modifications within the purview of those skilled in the art are intended to be within the scope of the invention.

Having now described our invention and the manner of practicing same, we claim:

1. In a continuous process for the production of urea wherein carbon monoxide is continuously reacted in a reaction zone with a mixture of ammonia and sulfur contained in an inert solvent, a reaction product mixture containing urea, ammonia, said inert solvent and a portion of the hydrogen sulfide formed in the reaction continuously removed from the reaction zone and urea recovered from said reaction product mixture, the improvement which comprises continuously countercurrently reacting carbon monoxide with said mixture of ammonia and sulfur contained in an inert solvent.

2. In a continuous process for the production of urea wherein carbon monoxide is continuously reacted in a reaction zone with a mixture of ammonia and sulfur contained in an inert solvent, a reaction product mixture containing urea, ammonia, said inert solvent and a portion of the hydrogen sulfide formed in the reaction continuously removed from the reaction zone and urea recovered from said reaction product mixture, the improvement which comprises continuously passing a mixture of ammonia and sulfur contained in an inert solvent downwardly through the reaction zone and continuously passing carbon monoxide upwardly through the reaction zone, the carbon monoxide thereby intimately contacting said mixture in a countercurrent flow relationship.

3. In a continuous process for the production of urea wherein carbon monoxide is continuously reacted in a reaction zone with a mixture of ammonia and sulfur contained in an inert solvent, a reaction product mixture containing urea, ammonia, said inert solvent and a portion of the hydrogen sulfide formed in the reaction continuously removed from the reaction zone and urea recovered from said reaction product mixture, the improvement which comprises continuously countercurrently reacting carbon monoxide with said mixture of ammonia and sulfur contained in an inert solvent while maintaining a reaction temperature in the range of from about 90° C. to about 125° C. and a reaction pressure above atmospheric pressure and below about 250 p. s. i. g.

4. In a continuous process for the production of urea wherein carbon monoxide is continuously reacted in a reaction zone with a mixture of ammonia and sulfur contained in an inert solvent, a reaction product mixture containing urea, ammonia, said inert solvent and a portion of the hydrogen sulfide formed in the reaction continuously removed from the reaction zone and urea recovered from said reaction product mixture, the improvement which comprises continuously countercurrently reacting carbon monoxide with said mixture of ammonia and sulfur contained in an inert solvent while maintaining a reaction temperature in the range of from about 90° C. to about 125° C. and a reaction pressure above atmospheric pressure and below about 250 p. s. i. g. and wherein the ammonia is employed in the molar ratio of from about 2 mols to about 4 mols for each mol of sulfur employed and carbon monoxide is employed in a quantity in excess of the stoichiometeric amount needed for the reaction.

5. The process as described in claim 4 wherein the solvent is methanol.

6. In a continuous process for the production of urea wherein carbon monoxide is continuously reacted in a reaction zone with a mixture of ammonia and sulfur contained in methanol, a reaction product mixture containing urea, ammonia, methanol and a portion of the hydrogen sulfide formed in the reaction continuously removed from the reaction zone and urea recovered from said reaction product mixture, the improvement which comprises continuously countercurrently reacting carbon monoxide with said mixture of ammonia and sulfur contained in methanol while maintaining a reaction temperature in the range of from about 90° C. to about 125° C. and a reaction pressure above atmospheric pressure and below about 250 p. s. i. g., and wherein the ammonia is employed in the molar ratio of from about 2 mols to about 4 mols for each mol of sulfur employed and carbon monoxide is employed in a quantity in excess of the stoichiometric amount needed for the reaction, and wherein the mixture of ammonia, sulfur and methanol is heated to a temperature in the range of from about 60° C. to about 130° C. prior to introduction of the mixture into the reaction zone.

No references cited.